United States Patent [19]
Innes

[11] 3,769,839
[45] Nov. 6, 1973

[54] ACOUSTIC SENSOR
[75] Inventor: Gary L. Innes, Hennepin, Minn.
[73] Assignee: Honeywell Inc., Minneapolis, Minn.
[22] Filed: May 3, 1971
[21] Appl. No.: 139,452

[52] U.S. Cl. ............................... 73/339 A, 73/357
[51] Int. Cl. .......................................... G01k 11/26
[58] Field of Search.................. 73/339 A, 349, 357

[56] References Cited
UNITED STATES PATENTS
| | | | |
|---|---|---|---|
| 3,581,569 | 6/1971 | Black | 73/349 X |
| 3,585,858 | 6/1971 | Black | 73/339 A |
| 3,083,574 | 4/1963 | Messerly | 73/357 |
| 3,618,385 | 11/1971 | Kelley et al. | 73/357 X |

Primary Examiner—Louis J. Capozi
Assistant Examiner—Frederick Shoon
Attorney—Charles J. Ungemach, Albin Medved and Michael L. Schwegman

[57] ABSTRACT

An acoustic oscillator adapted for use as a gas temperature sensor wherein a fluidic signal whose frequency is indicative of the temperature of the gas is generated by a hole-tone resonator. A housing member has first and second axially aligned orifices separated by an enclosed control volume. A jet passing through the orifices sets up oscillations which are reinforced by resonance of the control volume. The oscillations are further reinforced and stabilized by a second downstream chamber, which in the preferred embodiment is a half wavelength resonator. The half wavelength resonator terminates in a converging-diverging nozzle which promotes choked flow in the exhausting fluid, thereby making the sensor insensitive to variations in input pressure. The frequency of the oscillations thus produced is indicative of the temperature of the gas.

4 Claims, 3 Drawing Figures

PATENTED NOV 6 1973
3,769,839
FIG. 1
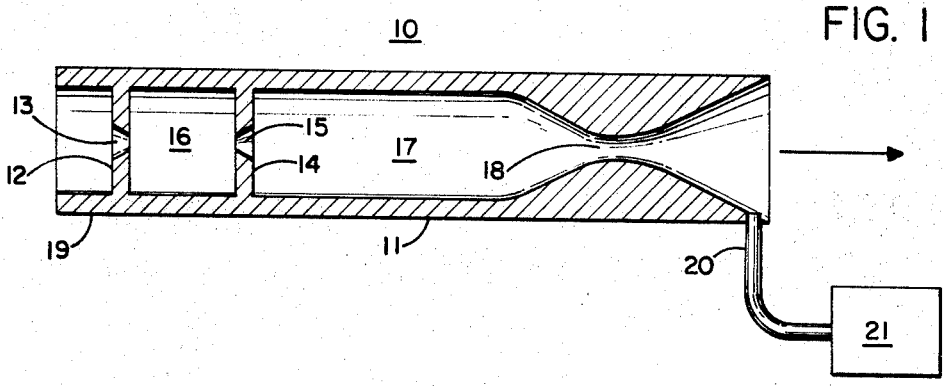
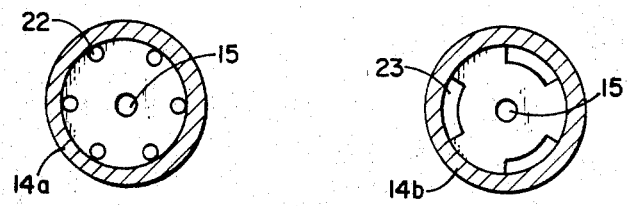
FIG. 2  FIG. 3
INVENTOR.
GARY L. INNES
BY
ATTORNEY

ACOUSTIC SENSOR

BACKGROUND OF THE INVENTION

This invention relates generally to acoustic oscillators, and more particularly to acoustic oscillators adapted for measuring the temperature of a gas.

In recent years various types of acoustic oscillators have been used for measuring the temperature of gases. In such devices, the gas whose temperature is to be measured is supplied to the oscillator under pressure, with the result that fluid dynamic oscillations are set up. The frequency of oscillation for a given acoustic oscillator depends upon the internal configuration and dimensions of the oscillator and upon the velocity of the input gas. For a given oscillator size and configuration, the frequency of oscillation also depends upon the speed of sound in the gas, which in turn depends upon the temperature and composition of the gas. Accordingly, a pickoff is provided to count the frequency of oscillation, which is indicative of temperature.

These prior art acoustic temperature sensors employ edge-tone resonance. In general, they comprise a housing having a chamber, a gas inlet nozzle, and a knife edge or other shaped splitter element positioned inside the chamber opposite the input nozzle so that a stream of gas from the nozzle impinges thereon. Instability of the impinging stream causes oscillation of the stream, which is reinforced by resonance within the chamber. In some devices, the splitter is so large or prominent as to effectively divide the chamber into two subchambers, but the basic operating principle is the same. Many of these prior art edge-tone resonance acoustic oscillators have a distinctive chamber configuration or exhaust arrangement so as to improve the performance of the device.

Acoustic temperature sensors in general have good overall performance, especially under severe environmental conditions in which they perform better than competing sensing techniques. However, the prior art acoustic temperature sensors are still subject to two problem areas. The first problem involves time response of the sensor when subjected to a step temperature change. The thermal response of the oscillator is delayed because of the time required to purge the old gas from the chamber and replace it with the gas having the newer temperature, and because of the time required to change the temperature of the housing. In an attempt to decrease the purging time of the chamber, some prior art devices have employed variously contoured chambers, and multiple exhaust passages. These features, while giving some improvement in performance, lead to the second problem area which is difficulty of manufacture and high cost.

To overcome these and other problems the applicant has provided a unique acoustic oscillator that employs the principle of hole-tone resonance, instead of edge-tone resonance as in prior art devices. By using the hole-tone resonance principle it is possible to build a temperature sensitive acoustic oscillator having much smaller physical size and therefore having less heat capacity and faster purging time than prior art sensors. For example, hole-tone oscillators having enclosed volumes one order of magnitude less than existing edge-tone devices have been built and successfully operated at comparable frequencies. Thus it is seen that the main advantage of temperature sensors according to the present invention is their very rapid thermal response.

A further advantage obtained through the use of the hole-tone resonance principle is that the full momentum of a free jet of gas does not impinge upon a critical surface or edge as is the case with the edge-tone resonator. Accordingly, the hole-tone resonator device is not subject to erosion and degradation of performance as are the prior art edge-tone devices.

Yet another advantage of temperature sensors according to the present invention is that their configuration is much simpler geometrically than existing edge-tone resonator devices, resulting in ease of manufacture and lower cost.

SUMMARY OF THE INVENTION

According to the present invention, the applicant has provided an acoustic oscillator suitable for sensing temperature, comprising a housing which defines a control volume chamber and a downstream chamber separated by a partition. The housing has a first orifice for admitting fluid into the control volume chamber and a second orifice axially aligned with the first orifice for exhausting fluid from the control volume chamber to the downstream chamber. A fluid jet entering through the first orifice impinges on the partition adjacent the second orifice and sets up fluid dynamic oscillations which are reinforced and stabilized primarily by the control volume, and secondarily by the downstream chamber. An outlet nozzle is provided for exhausting fluid from the downstream chamber. The frequency of the oscillations is indicative of the temperature of the fluid.

BRIEF DESCRIPTION OF THE DRAWING

FIG. 1 is a cross-sectional view of a preferred embodiment of the present invention;

FIG. 2 is a view of a partition for use in an alternate embodiment; and

FIG. 3 is likewise a view of another partition for use in another alternate embodiment of the present invention.

DESCRIPTION OF THE PREFERRED EMBODIMENT

In FIG. 1, reference numeral 10 generally designates an acoustic temperature sensor according to the present invention. Temperature sensor 10 comprises a housing 11 which is generally circularly cylindrical in shape. Near the front of housing 11 is a partition 12 in which is formed an orifice 13. A second partition 14 is positioned also inside housing 11, in which is formed orifice 15. For successful operation it is necessary that orifices 13 and 15 be of substantially the same area and that they be accurately aligned. The volume enclosed between partitions 12 and 14 is the control volume 16. Near the center of housing 11 is another enclosed volume, referred to as downstream chamber 17. Near the right end of housing 11, the inside walls are flared inward then outward to form a converging-diverging nozzle 18. The extreme left end of housing 11 forms a flange 19 which functions as a quarter wavelength resonator.

In operation, the end of temperature sensor 10 containing flange 19 is connected to a source of pressurized gas whose temperature is to be measured. For example, the temperature sensor could be inserted through the turbine housing of the turbojet engine, for measuring the turbine inlet temperature of the engine. When temperature sensor 10 is thus connected, gas flows through orifices 13 and 15, and converging-diverging nozzle 18 to be exhausted to the atmosphere.

Partitions 12 and 14, and orifices 13 and 15 comprise a hole-tone generator. A jet of gas passing through orifice 13 impinges on partition 14, causing the jet to set up oscillations. The oscillations are due to the generation and shedding of toroid shaped vortices by the jet. The frequency of the oscillations thus set up depends upon the velocity of the jet passing through orifice 13, and upon the distance between the two orifices. Specifically, the frequency is directly proportional to the jet velocity and inversely proportional to the distance.

The walls of housing 11 define control volume 16 which acts as a resonator to reinforce the oscillations and stabilize their frequency to a desired nominal value. In practice, once the spacing between the orifices is selected and the velocity through the orifices is fixed, the volume of control chamber 16 is selected to reinforce one of the dominant frequencies of the hole-tone generator, by appropriate choice of the diameter of housing 11. For a given volume of control chamber 16, more than one frequency of oscillation will result in resonance. At a certain low frequency, control volume 16 behaves as a Helm-holtz or pulsating, type of resonator. However, at a higher frequency, control volume 16 serves as a radial half wavelength resonator. At this frequency acoustic energy is reflected off the walls of housing 11 and returns to the center of control volume 16 in phase with the oscillations producing a resonant condition. Since more than one resonant frequency does exist, it is necessary to control the velocity of the jet through orifice 13, so that only the preferred frequency is excited. Control of the jet velocity is provided by the action of converging-diverging nozzle 18, as is explained in a subsequent paragraph.

The purpose of the quarter wavelength resonator formed by flange 19 is to act as an acoustic filter to attenuate random noise input to the sensor, and to reinforce the primary acoustic oscillation frequency.

The oscillations thus set up and reinforced within control volume 16 are further reinforced and stabilized by downstream chamber 17, which, in the embodiment shown in FIG. 1 is selected to be a half wavelength resonator. The length of resonator chamber 17 is selected to be any integral multiple of one half the wavelength of the desired nominal frequency, so that acoustic energy entering resonator chamber 17 through orifice 15 is reflected from the right end of resonator 17 back to orifice 15 in phase so as to further reinforce the oscillations.

The velocity of the jet passing through orifice 13 is controlled as follows. The converging-diverging configuration of nozzle 18 promotes choked (also called sonic) flow therethrough. In order to attain this flow condition, it is necessary that the area of nozzle 18 be substantially smaller than nozzles 13 and 15. In practice, nozzle 18 is usually made about half the area of the upstream nozzles. In a flow condition through series orifices in which the flow through the downstream orifice is choked, the pressure ratio across the upstream orifices remains fixed, even though the input pressure may vary. The constant pressure ratio across orifice 13 is a constant Mach number flow, because the flow therethrough is compressible. Accordingly, a constant Mach number of flow is maintained despite variations in the absolute value of the input pressure.

In this manner, the temperature sensor used to measure the turbine inlet temperature of the turbojet engine in the preceding example is sensitive only to the temperature of the gas, and is insensitive to changes in pressure which may occur inside the engine under varying operating conditions.

In FIG. 1, a pickoff 20 is positioned in the outflow field from converging-diverging nozzle 18. Pickoff 20 is connected to transducer 21 for conveying the oscillating signal produced by sensor 10. Transducer 21 converts the oscillating acoustic signal to electrical signals. These electrical signals may be supplied to an electronic counter (not shown) so as to determine their frequency, which of course is indicative of the temperature of the gas. It is also possible to place pickoff 20 through the wall of housing 11 into resonant chamber 17, instead of the position shown in FIG. 10. However, it is generally not satisfactory to place pickoff 20 in control volume 16 because in a practical device, control volume 16 is so small that the intrusion or even a small pickoff would have significant degrading effects upon the signal.

An alternate embodiment of a temperature sensor according to the present invention is indicated in FIGS. 2 and 3. FIG. 2 is an end on view of a partition 14A which can be used in place of partition 14 in the temperature sensor of FIG. 1. Partition 14A has a centrally located orifice 15 identical to the one in FIG. 1. In addition, partition 14A has a plurality of orifices 22 near its periphery. The purpose of these orifices is to provide additional paths for fluid to escape from control volume chamber 16 to downstream chamber 17. These extra paths result in faster purging of the gas from control volume chamber 16 which gives the sensor the advantage of an even faster thermal response. In addition, orifices 22 provide for pressure relief during the oscillations within control volume chamber 16 allowing the oscillations to reach a higher amplitude.

FIG. 3 shows another variation similar to the one shown in FIG. 2. In FIG. 3 partition 14B has centrally located orifice 15 as before, and in addition, a plurality of slots 23 positioned around its periphery. The function of slots 23 is identical to that of orifices 22 in FIG. 2. It is understood that the number and size of orifices 22 and slots 23 may be varied according to operating conditions desired.

The embodiment of applicant's invention shown in FIG. 1, and also the embodiments described in conjunction with FIGS. 2 and 3 all employ a downstream chamber 17 which is selected to be a half wavelength resonator, because it has been found that in most instances improved performance results from such a selection. However, it should be understood that the temperature sensor will operate regardless of the dimension of downstream chamber 17. Providing addition reinforcement and stabilization for the oscillations is only one of the functions of downstream chamber 17. Its most basic function is simply to provide separation between orifice 15 and converging-diverging orifice 18.

I claim as my invention:

1. An acoustic temperature sensing oscillator which comprises housing means defining a control volume chamber and a downstream chamber, said housing means having a first orifice for admitting a stream of fluid into said control volume chamber, said housing means also having an outlet nozzle for exhausting fluid from said downstream chamber, said housing means further having a partition dividing said control volume chamber and said downstream chamber, said partition having a second orifice axially aligned with said first orifice for exhausting fluid from said control volume chamber to said downstream chamber so that acoustic oscillations are set up by a fluid jet passing through said first orifice and impinging on said second orifice, said downstream chamber comprising a half wavelength resonator for the frequency of oscillations produced, whereby said acoustic oscillations are reinforced and stabilized by resonance in said control volume chamber and in said half wavelength resonator, the frequency of said oscillations being indicative of the temperature of the fluid.

2. Apparatus according to claim 1 wherein said outlet nozzle comprises a converging-diverging nozzle having an area less than the area of said first and second orifices for promoting choked flow therethrough, whereby said acoustic temperature sensing oscillator is insensitive to changes in pressure of the fluid stream applied to said first orifice.

3. Apparatus according to claim 1 wherein said partition includes aperture means spaced from said axis, in addition to said second orifice for exhausting fluid from said control volume chamber.

4. Apparatus according to claim 1 wherein said housing further includes a quarter wavelength resonator adjacent said first orifice.

* * * * *